United States Patent [19]

Rademachers et al.

[11] 4,090,888
[45] May 23, 1978

[54] PRODUCTION OF BLACK IRON OXIDE PIGMENTS

[75] Inventors: Jakob Rademachers; Franz Hund, both of Krefeld; Ingo Pflugmacher, Meerbusch; Gerhard Winter, Krefeld, all of Germany

[73] Assignee: Bayer Aktiengesellschaft, Leverkusen, Germany

[21] Appl. No.: 674,995

[22] Filed: Apr. 8, 1976

[30] Foreign Application Priority Data

Apr. 24, 1975 Germany .............................. 2518283

[51] Int. Cl.² ................................................ C01G 49/08
[52] U.S. Cl. ..................... 106/304; 423/632; 106/299; 106/300; 106/302; 106/288 B
[58] Field of Search ......................... 106/304; 423/632; 252/62.56

[56] References Cited

U.S. PATENT DOCUMENTS

| 3,867,516 | 2/1975 | Bodson | 423/632 |
| 3,928,709 | 12/1975 | Audran et al. | 252/62.56 |
| 4,025,611 | 5/1977 | Montino et al. | 423/632 |

FOREIGN PATENT DOCUMENTS 1,252,646  10/1967  Germany .............................. 423/632

Primary Examiner—Winston A. Douglas
Assistant Examiner—J. V. Howard
Attorney, Agent, or Firm—Burgess, Dinklage & Sprung

[57] ABSTRACT

In a two-stage process for producing black iron oxide pigments wherein an iron salt solution is alkalized in a first stage to precipitate about 55 to 70% of the iron, the solution is oxidized to convert the precipitate to goethite, the solution is further alkalized in a second stage to precipitate the balance of the iron, the precipitated iron II hydroxide is allowed to react with goethite to form magnetite, the improvement which comprises effecting the second stage in the presence of an inorganic ionic compound of at least one metal selected from the group consisting of copper, nickel, aluminum, chromium, titanium, zirconium and vanadium in about 0.05 to 5% calculated as metal based on the weight of the final pigment. The resulting pigment is of high color intensity, narrow grain distribution range and pronounced magnetite structure.

10 Claims, No Drawings

PRODUCTION OF BLACK IRON OXIDE PIGMENTS

Pure iron oxide black pigments are iron (II)-iron(III)-oxides of magnetite structure. They may be obtained either by the oxidation of metallic iron or iron(II)-compounds or by the reduction of iron(III)-compounds.

The present invention relates to a process for the production of iron oxide black pigments which is based on the oxidation of iron(II)-compounds. Processes of this kind frequently use, as starting materials, iron salts of the type which accumulate as waste liquors in pickling plants. Accordingly, the starting materials are, primarily, iron sulfates or iron chlorides. Alkali compounds, for example sodium or potassium hydroxide, soda, ammonia or milk of lime, are added to aqueous solutions of these iron salts, after which the freshly precipitated iron(II)-hydroxides or carbonates are oxidized at temperatures above 50° C. Oxidation is carried out at pH-values above 6, either by the introduction of oxygen-containing gases, generally air, or by the addition of other oxidizing agents, such as hydrogen peroxide, nitrates or chlorates.

Since this method of producing iron oxide black pigments involves the precipitation of iron compounds, it is known as the precipitation process. There are two different variants to the precipitation process which are distinguished from one another by the number of process stages involved. In a single-stage process, the solution containing iron salts is alkalized, thereby precipitating all the iron present in it, followed by oxidation.

By contrast, in a two-stage process, only part of the iron (about 55 to 70% by weight) is initially precipitated and completely oxidized at temperatures of about 10° C to 99° C, still in the acid range (pH about 2 to 7), to form goethite (—FeOOH) which, in the second stage, is converted into magnetite by further precipitation with freshly prepared iron(II)hydroxide at temperatures of about 40° C to 100° C in an alkaline medium (pH about 7 to 14).

Instead of the first precipitation stage, it is also possible to use goethite produced separately by a different method, for example in the form of iron oxide yellow pigment or seed. It has been found that the particle size of the black pigment obtained can be controlled in dependence upon the particle size of the goethite used.

The object of the present invention is inter alia to obtain iron oxide black pigments with a high strength of color. It is known that the color intensity of black pigments increases with decreasing particle size, as clearly shown by the various commercially available carbon black pigments. With decreasing particle size, however, iron oxide black pigments frequently lose their otherwise pure, deep black color, in other words any increase in the intensity of color is accompanied by a change in the blue-black color to shades generally showing tinges of brown. This is often the case when the starting materials used for the two-stage process are iron oxide hydroxide of the type used as seeds in the production of iron oxide yellow, as mentioned in U.S. Pat. No. 2,631,085.

The present invention is concerned with the production of blue-black iron oxide black pigments with a high intensity of color. More particularly, the invention is concerned with the production of these coloristically improved iron oxide pigments by the two-stage precipitation process. Accordingly, the present invention provides a process for the production of iron oxide black pigments by the two-stage precipitation method, in which inorganic ionic compounds of the metals copper, nickel, aluminum, chromium, titanium, zirconium and/or vanadium are added to the starting solutions containing iron salts in quantities of about 0.05 to 5% by weight and preferably in quantities of about 0.1 to 2% by weight of metal, based on the end pigment.

It has surprisingly been found that the addition of these metal compounds is only effective in the two-stage process. It was not possible to observe an equivalent improvement in color by the addition of these metal compounds in the single-stage process.

The above-mentioned additives may be added either in the first precipitation stage and/or in the second precipitation stage.

The metal compounds added in accordance with the invention may be used both in the form of aqueous solutions of their salts, for example their sulfates, chlorides or nitrates, and in the form of suspensions of their hydroxides, oxide hydroxides or oxides and also in the form of their solids, for example carbonates. Compounds of Cu and Ti, especially in the form of their sulfates, are particularly suitable.

It is also possible to use, as starting material, iron salts of the kind which already contain one or more of the above-mentioned metal compounds as impurities as is the case, for example, with titanium-containing iron sulfate heptahydrate which accumulates as secondary product in the production of titanium dioxide by the so-called sulfate process; where the impurity is present but not in sufficient quantity, its content may be supplemented by an appropriate addition. The pigments obtained are characterised not only by their intensity of color and their color per se, but also by their narrow grain distribution range and by their pronounced magnetite structure.

They are converted into red pigments by calcination at temperatures of the order of 800° C. The iron oxide black pigments produced in accordance with the invention are particularly suitable for pigmenting lacquer binders or building materials. The process according to the invention is illustrated in the following Examples. The color and intensity of color of the pigments produced in accordance with the invention were compared with those of a known iron oxide black pigment produced by the aniline process (comparison pigment).

EXAMPLE 1

A 40% sodium hydroxide solution was added with stirring to an aqueous solution of iron sulfate containing 150 g/l of $FeSO_4$ emanating from pickling plants in such a quantity that 60% of the iron was precipitated in the form of $Fe(OH)_2$. This precipitated iron was oxidized to the trivalent stage by subsequent treatment with air for about 10 hours at a temperature in the range from 30° to 40° C. A pH-value of from 2 to 3 was obtained. The ratio of $Fe^{III}$ to $Fe^{II}$ amounted to between 1.4 and 1.6. This solution of the first stage had an $FeSO_4$-content of from 50 to 60 g/l and an FeOOH-content of from 45 to 55 g/l.

In the second stage, the particular metal sulfate solution selected was added to this solution, the residual iron content was precipitated by the addition of 15 to 20% sodium hydroxide up to pH 8 and the reaction to form magnetite was subsequently carried out at 80° C. During the reaction, the pH-value was maintained at pH 8 by the addition of more sodium hydroxide. The reaction had ceased when no more sodium hydroxide was required for keeping the pH-value constant. The reaction time amounted to between about 1.5 and 2 hours. For a solids content of from 50 to 60 g/l, the volume time yield of the second stage amounted to between 30 and 40 g/l × h.

Filtration and washing were followed by drying at 60° C to 100° C. The pigments obtained showed a well developed magnetite structure. Their ratio of $Fe^{III}$ to $Fe^{II}$ amounted to between 2 and 2.5. The average particle size is 0.2 μm. Their specific surface (according to BET) amounted to between 7 and 8 m²/g. The color evaluation of the pigments obtained was shown in the accompanying Table. It can be seen from this Table that strength of color decreases and the blue-black color becomes more intense with increasing addition of foreign metal. The metals added differ in their effect. The best effect is obtained by the addition of copper compounds.

With a metal addition of 0.05% by weight or less, there is no further improvement in color. If no metal at all is added, the product obtained is tinged much more heavily with brown and is sensitive to oxidation in air on account of its particle fineness. Despite the increase in intensity of color obtained, this pigment remains uninteresting for practical purposes.

EXAMPLE 2

Iron sulfate heptahydrate formed during the production of $TiO_2$, with a $TiO_2$ content of 0.15% and an $Al_2O_3$ content of around 0.05%, was used instead of an aqueous iron sulfate solution emanating from pickling plants. Otherwise the procedure was exactly the same as in Example 1. The iron oxide black obtained had a specific surface (according to BET) of 9 m²/g. It had a titanium content of 0.3% by weight of Ti and an Al content of 0.1% by weight. Photographs taken with an electron microscope showed well-developed cubic particles with a narrow particle size distribution around 0.2 μm. Color evaluation in accordance with DIN 53 234 showed an improvement in strength of color of 30% with a more blue-black color by comparison with a known iron oxide black pigment produced by the aniline process (comparison pigment).

Color Evaluation Table:

| Addition, % by weight based on $Fe_3O_4$ | Relative strength of color according to DIN 53 234, comparison pigment = 100 | Color in relation |
| --- | --- | --- |
| 0.8 % Al | 100 | much more blue-black |
| 0.4 % Al | 110 | more blue-black |
| 0.15 % Al | 130 | slightly more blue-black |
| 0.08 % Al | 135 | slightly more blue-black |
| 0.4 % Al | 150 | as comparison pigment |
| 2.0 % Ni | 100 | much blacker |
| 1.0 % Ni | 120 | more blue-black |
| 0.4 % Ni | 130 | more blue-black |
| 0.2 % Ni | 140 | slightly more blue-black |
| 0.1 % Ni | 140 | slightly more blue-black |
| 2.0 % Cu | 140 | more blue-black |
| 1.0 % Cu | 150 | more blue-black |
| 0.4 % Cu | 140 | more blue-black |
| 0.2 % Cu | 150 | more blue-black |
| 0.1 % Cu | 150 | more blue-black |
| 1.2 % Cr | 100 | much more blue-black |
| 0.6 % Cr | 120 | more blue-black |
| 0.3 % Cr | 140 | more blue-black |
| 0.1 % Cr | 140 | slightly more blue-black |
| 0.05 % Cr | 150 | as comparison pigment |
| 1.0 % Ti | 120 | more blue-black |
| 0.5 % Ti | 130 | more blue-black |
| 0.2 % Ti | 140 | more blue-black |
| 1.0 % V | 110 | much more blue-black |
| 0.4 % V | 140 | more blue-black |
| 0.2 % V | 140 | more blue-black |
| 0.1 % V | 150 | as comparison pigment |
| none | 190 | much more heavily tinged with brown, sensitive in oxidation. |

As noted, the particles exhibit a narrow grain distribution range and a small particle size, i.e. more than about 90% of the particles are about 0.15 to 0.30 μm.

It will be appreciated that the instant specification and examples are set forth by way of illustration and not limitation, and that various modifications and changes may be made without departing from the spirit and scope of the present invention.

What is claimed is

1. In a two-stage process for producing iron oxide black pigment wherein goethite is formed in a first stage, and in a second stage the goethite is suspended in an iron (II)-containing solution, the solution is rendered alkaline to precipitate iron (II) hydroxide or carbonate and the precipitate is reacted to form magnetite, the improvement which comprises effecting the second stage in the presence of an inorganic ionic compound of at least one metal selected from the group consisting of copper, nickel, aluminum, chromium, titanium, zirconium and vanadium in about 0.05 to 5% calculated as metal based on the weight of the final pigment.

2. A process as claimed in claim 1, wherein the first stage is effected by adding alkali to a solution of an iron salt in amount sufficient to precipitate about 55 to 70% of the iron as $Fe(OH)_2$ or $FeCO_3$, and oxidizing the precipitate to goethite.

3. A process as claimed in claim 1, wherein the starting material for the first stage is iron sulfate heptahydrate obtained as a by-product in the production of titanium dioxide.

4. A process as claimed in claim 1, wherein the second stage is effected in water and the ionic metal compound is dissolved or suspended therein in about 0.1 to 2% calculated as metal based on the weight of the final pigment.

5. A process as claimed in claim 4, wherein the ionic metal compound is present during the first stage and is carried through to the second stage.

6. A process as claimed in claim 4, wherein the ionic metal compound is copper or titanium sulfate.

7. A process as claimed in claim 6, wherein the first stage is effected by adding alkali to a solution of an iron salt in amount sufficient to precipitate about 55 to 70% of the iron as $Fe(OH)_2$ or $FeCO_3$, and oxidizing the precipitate to geothite.

8. A black iron oxide pigment produced by the process of claim 1.

9. A black iron oxide pigment produced by the process of claim 1 and having a narrow grain distribution range and a pronounced magnetite structure.

10. A lacquer, binder or building material colored with a black iron oxide pigment produced by the process of claim 1.

* * * * *